(No Model.)
E. MARCHAUT & A. DORMOY.
VALVE.
No. 582,507. Patented May 11, 1897.
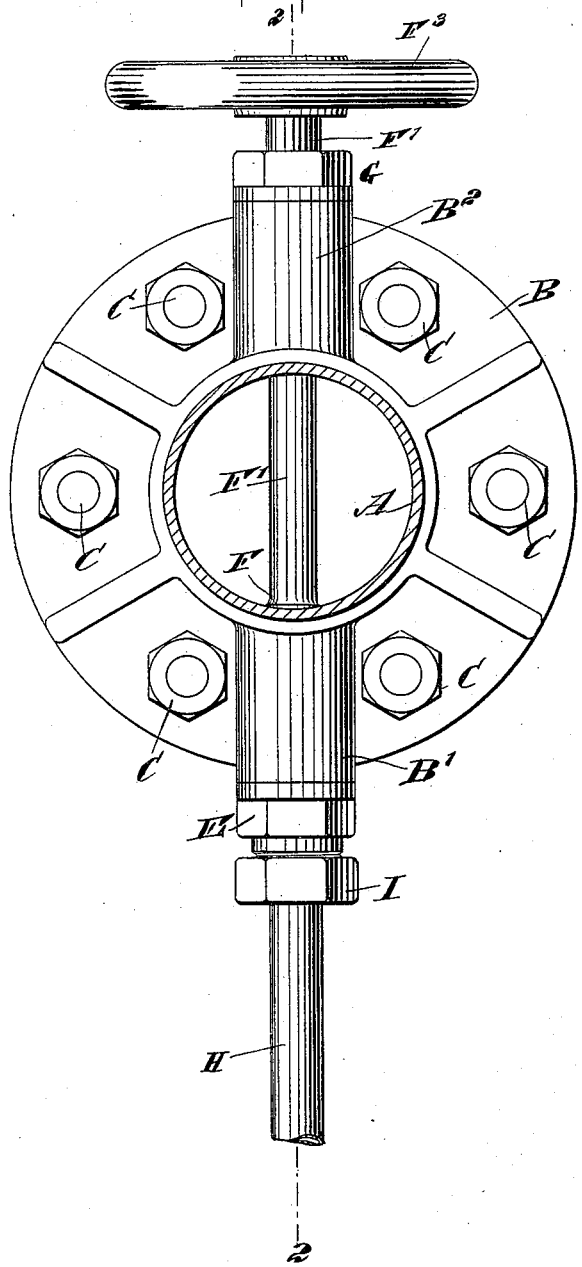
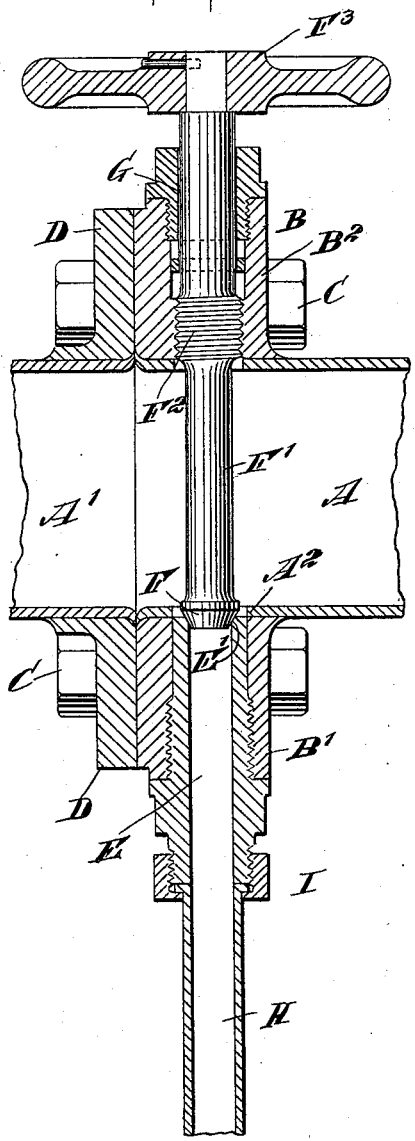
WITNESSES:
INVENTORS
E. Marchaut
A. Dormoy
BY
ATTORNEYS.

UNITED STATES PATENT OFFICE.

EDOUARD MARCHAUT AND ALBERT DORMOY, OF BORDEAUX, FRANCE.

VALVE.

SPECIFICATION forming part of Letters Patent No. 582,507, dated May 11, 1897.

Application filed October 14, 1896. Serial No. 608,803. (No model.) Patented in France January 14, 1895, No. 244,323.

*To all whom it may concern:*

Be it known that we, EDOUARD MARCHAUT and ALBERT DORMOY, citizens of France, residing at Bordeaux, France, have invented a new and Improved Valve, of which the following is a full, clear, and exact description, and for which Letters Patent of France, No. 244,323, were granted to us on January 14, 1895.

The object of the invention is to provide a new and improved valve more especially designed for draining the water of condensation from a steam-pipe or other device.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in both the figures.

Figure 1 is an end elevation of the improvement, and Fig. 2 is a sectional side elevation of the same on the line 2 2 of Fig. 1.

On the end of the steam-pipe A is secured a flange B, connected by bolts C with a flange D, secured on the pipe-section A', forming a continuation of the pipe A. The flange B is formed at its bottom with an enlargement B', into which screws an outlet or discharge pipe E, formed at its upper end with a valve-seat E', registering with the opening of the flange and with an opening $A^2$ in the pipe A, as plainly shown in Fig. 2. A valve F, preferably of the conical type, is adapted to be seated on the seat E' for closing the pipe E, said conical valve being movable through the flange-opening $A^2$ to engage the said seat or to move upwardly therefrom.

The conical valve F is provided with a valve-stem F', which extends through the pipe A and is formed with screw-threads $F^2$, screwing in an offset $B^2$, formed on the upper portion of the flange B, as is plainly shown in the drawings. The upper end of the stem F' then extends through a stuffing-box G, held in the offset $B^2$, and on the extreme upper end of the said stem is secured a hand-wheel $F^3$ to enable the operator to turn the screw-rod so as to screw the same up and down and move the valve F from and to its valve-seat E'. The outer end of the pipe E is connected with a discharge-pipe H by means of a union-coupling I or other means, and this pipe H leads to a suitable place of discharge.

It is evident that by the arrangement described the water of condensation forming in the steam-pipe can be readily discharged, when the valve F is opened, without danger of causing a leakage in the pipe A, as the valve and its seat are held in the flange B for the pipe A.

It is evident that the valve and its seat may be differently arranged without deviating from the spirit of our invention, the essential features of which are the valve-seat in the flange and a valve for opening and closing the said valve-seat.

Having thus fully described our invention, we claim as new and desire to secure by Letters Patent—

1. The combination with the abutting pipe-sections one of which is provided with alining apertures adjacent to the joint, of a flanged coupling engaging the pipe-sections and provided with radial apertures registering with those of the pipe-section, and a valve for controlling the connection of one of said apertures in the coupling with the interior of the pipe, the valve-stem extending through the other aperture of the coupling, substantially as described.

2. A pipe-coupling, comprising two flanged members or sockets adapted to receive pipe-sections, means for connecting said sockets, one of the sockets having an outlet leading from its inner face at a distance from the abutting surfaces of the sockets, and a valve for closing said outlet, substantially as described.

3. A pipe-coupling, comprising two flanged members or sockets adapted to receive pipe-sections, means for connecting said sockets, one of the sockets having an outlet leading from its inner face at a distance from the abutting surfaces of the sockets, and an aperture arranged opposite said outlet, and a valve for closing said outlet, the valve-stem being adapted to extend through the said aperture, substantially as described.

4. A pipe-coupling, comprising two flanged members or sockets adapted to receive pipe-sections, means for connecting said sockets, one of the sockets having an opening leading from its inner face at a distance from the abutting surfaces of the sockets, an outlet-pipe inserted into said opening, and a valve adapted to be seated on the end of said outlet-pipe, substantially as described.

EDOUARD MARCHAUT.
ALBERT DORMOY.

Witnesses:
 JOHN SUSTON BEECHER,
 S. VOISIN.